(12) United States Patent
de Anda et al.

(10) Patent No.: US 11,795,259 B2
(45) Date of Patent: Oct. 24, 2023

(54) METHODS FOR PRODUCTION OF HIGH IMPACT POLYSTYRENE HAVING AN IMPROVED RUBBER MORPHOLOGY

(71) Applicant: FINA TECHNOLOGY, INC., Houston, TX (US)

(72) Inventors: Carlos de Anda, Pearland, TX (US); Giovanni Trimino, Houston, TX (US); Bradley Stiles, Houston, TX (US); Jose Sosa, Deer Park, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 109 days.

(21) Appl. No.: 17/231,242

(22) Filed: Apr. 15, 2021

(65) Prior Publication Data

US 2021/0324128 A1   Oct. 21, 2021

Related U.S. Application Data

(60) Provisional application No. 63/010,498, filed on Apr. 15, 2020.

(51) Int. Cl.
C08F 279/02    (2006.01)

(52) U.S. Cl.
CPC .................................. *C08F 279/02* (2013.01)

(58) Field of Classification Search
CPC ................................................... C08F 279/02
See application file for complete search history.

(56) References Cited

U.S. PATENT DOCUMENTS

| | | | |
|---|---|---|---|
| 3,660,535 A | 5/1972 | Finch et al. | |
| 5,189,095 A | 2/1993 | Hall | |
| 2007/0100079 A1* | 5/2007 | Sosa | C08F 12/08 525/244 |
| 2012/0277375 A1* | 11/2012 | DeAnda | C08F 279/02 525/70 |
| 2012/0289656 A1* | 11/2012 | Knoeppel | C08L 25/10 525/232 |
| 2017/0121501 A1* | 5/2017 | Trimino | C08K 5/17 |
| 2020/0362263 A1* | 11/2020 | Ravishankar | C08F 4/65908 |

FOREIGN PATENT DOCUMENTS

| | | |
|---|---|---|
| GB | 1228495 A | 4/1971 |
| JP | H04366116 A | 12/1992 |
| JP | H07173231 A | 7/1995 |

OTHER PUBLICATIONS

PCT/US2021/027468 International Search Report and Written Opinion dated Jul. 29, 2021 (13 p.).

* cited by examiner

*Primary Examiner* — Jeffrey C Mullis
(74) *Attorney, Agent, or Firm* — CONLEY ROSE, P.C.

(57) ABSTRACT

A process for producing high impact polystyrene comprising introducing to a reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the reactor to the phase inversion point to form a phase-inverted mixture; recovering a portion of the phase-inverted mixture from the reactor wherein the phase-inverted mixture comprises high impact polystyrene; and introducing another portion of the phase-inverted mixture to another reactor.

13 Claims, 4 Drawing Sheets

METHODS FOR PRODUCTION OF HIGH IMPACT POLYSTYRENE HAVING AN IMPROVED RUBBER MORPHOLOGY

CROSS-REFERENCE TO RELATED APPLICATIONS

This application claims the benefit of U.S. Provisional Patent Application Ser. No. 63/010,498, filed Apr. 15, 2020, and entitled "Methods for Production of High Impact Polystyrene Having an Improved Rubber Morphology," which is hereby incorporated herein by reference in its entirety for all purposes.

STATEMENT REGARDING FEDERALLY SPONSORED RESEARCH OR DEVELOPMENT

Not applicable.

TECHNICAL FIELD

The present disclosure relates generally to the production of high-impact polystyrene and more specifically to the production of high-impact polystyrene having an improved rubber morphology.

BACKGROUND

Elastomer-reinforced polymers of monovinylidene aromatic compounds such as styrene, alpha-methylstyrene and ring-substituted styrene have found widespread commercial use. For example, elastomer-reinforced styrene polymers having discrete particles of cross-linked elastomer dispersed throughout the styrene polymer matrix can be useful for a range of applications including food packaging, office supplies, point-of-purchase signs and displays, housewares and consumer goods, building insulation and cosmetics packaging. Such elastomer-reinforced polymers are commonly referred to as high impact polystyrene (HIPS).

The mechanical properties of the HIPS and thus its potential applications are largely dependent on the elastomeric (rubber) particles having a desirable morphological structure. Herein the terms "elastomer" and "rubber," as in the art, are used interchangeably. For example, an undesirable mixed morphology may be characterized by a wide rubber particle size distribution with the HIPS having a significant level of small rubber particles with mean diameters of less than 1 micron. Small rubber particles with mixed morphologies such as thread or maze morphologies may lead to poor rubber utilization. Furthermore, HIPS with morphologies characterized by the presence of small rubber particles generally exhibit poor ductile properties with low values for the percent elongation at fail. Thus, a need exists for a method of producing HIPS with improved rubber morphologies as indicated by a narrow rubber particle size distribution.

BRIEF SUMMARY

Disclosed herein is a process for producing high impact polystyrene comprising introducing to a reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the reactor to the phase inversion point to form a phase-inverted mixture; recovering a portion of the phase-inverted mixture from the reactor wherein the phase-inverted mixture comprises high impact polystyrene; and introducing another portion of the phase-inverted mixture to another reactor.

Also disclosed herein is a process for producing high impact polystyrene comprising introducing to a first reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the first reactor to the phase inversion point to form a phase-inverted mixture; introducing to a second reactor a portion of the phase-inverted mixture from the first reactor, wherein the second reactor is disposed downstream of the first reactor and recovering another portion of the phase inverted mixture, wherein the recovered another portion of the phase-inverted mixture comprises high impact polystyrene.

Also disclosed herein is a high impact polystyrene reactor system, comprising a first continuously stirred tank reactor having (a) an inlet configured to receive (i) at least one vinyl aromatic monomer, (ii) an elastomer, and (iii) a free radical initiator and (b) an outlet configured to convey a first reactor effluent; a second continuously stirred tank reactor having (a) an inlet in fluid communication with the first continuously stirred tank reactor outlet and configured to receive (i) a portion of the first reactor effluent from the first continuously stirred tank reactor, (ii) at least one vinyl aromatic monomer, (iii) an elastomer, and (iv) a free radical initiator and (b) an outlet configured to convey a portion of a second reactor effluent comprising high impact polystyrene; and (c) a conduit for establishing a recirculation stream between the second reactor and the first reactor wherein the recirculation stream comprises another portion of the second reactor effluent.

The foregoing has outlined rather broadly the features and technical advantages of the presently disclosed subject matter in order that the detailed description that follows may be better understood. Additional features and advantages of the disclosed subject matter will be described hereinafter that form the subject of the claims of the present disclosure. It should be appreciated by those skilled in the art that the conception and the specific aspects disclosed may be readily utilized as a basis for modifying or designing other structures for carrying out the same purposes of the presently claimed subject matter. It should also be realized by those skilled in the art that such equivalent constructions do not depart from the spirit and scope of the presently claimed subject matter as set forth in the appended claims.

BRIEF DESCRIPTION OF THE DRAWINGS

For a detailed description of the aspects of the presently disclosed subject matter, reference will now be made to the accompanying drawings in which.

DETAILED DESCRIPTION

Disclosed herein is a method for the production of a HIPS having a rubber particle size distribution (RPSD or span) of equal to or less than about 1.5. Such HIPS having a narrow rubber particle size distribution are termed improved morphology HIPS and designated herein as IM-HIPS.

Figure 1:
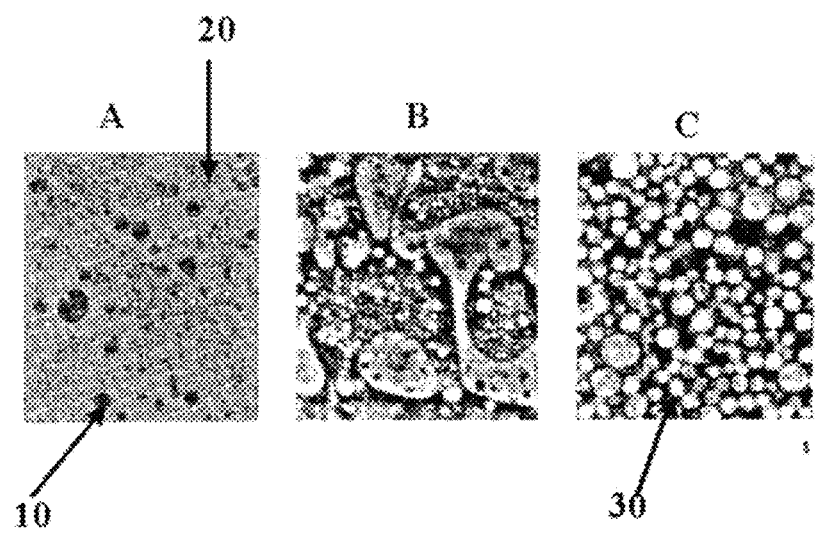
FIG. 1 is an illustration of the HIPS polymerization reaction.

The production of HIPS generally comprises the dissolution of a rubber (e.g., polybutadiene elastomer (PB)) in styrene that is subsequently polymerized. During polymerization, a phase separation based on the immiscibility of polystyrene (PS) and polybutadiene (PB) occurs in two stages. Initially, the PB forms the major or continuous phase with styrene dispersed therein. As the reaction begins, PS droplets 10 (darker circles) form and are dispersed in an elastomer solution 20 (lighter background) of PB and styrene monomer, as shown in FIG. 1A. As the reaction progresses and the amount of polystyrene continues to increase, a morphological transformation or phase inversion occurs such that the PS now forms the continuous phase and the PB and styrene monomer forms the discontinuous phase, as shown in FIG. 1B. This phase inversion leads to the formation of the discontinuous phase comprising complex elastomeric particles in which the elastomer exists in the form of PB membranes surrounding occluded domains of PS, as indicated by reference numeral 30 (lighter circles) in FIG. 1C. Shear agitation may be used in order to cause the phase inversion. Polymerizations carried out in a rheometer have shown that a shear rate of 10-30 sec$^{-1}$ is sufficient to invert the two phases.

HIPS polymerization may be represented according to the chemical equations given in Scheme I:

In an aspect, a method for the production of an IM-HIPS comprises a first reactor to which is introduced a first reaction mixture comprising a styrene monomer, an elastomeric particle and a free-radical initiator, each of which will be described in more detail later herein. The first reaction mixture may then be polymerized in the first reactor to form a reacted mixture. For example, the first reaction mixture may be polymerized until the percent solids in the first reaction mixture ranges from 1% to about 25%, alternatively from about 1% to about 10% or alternatively from about 5% to about 10% based on the total amount of solids in the reactor. In an aspect, the reacted mixture comprises primarily unreacted styrene, rubber, and polystyrene.

A method for the production of an IM-HIPS of the present disclosure further comprises introduction of at least a portion of the reacted mixture as a component of a feedstock to a second reactor. In some aspects, the reacted mixture is introduced to the second reactor discontinuously in amounts that range from about 1 volume percent (vol. %) to about 20 vol. % based on the total volume of the first reactor, alternatively from about 1 vol. % to about 15 vol. % or alternatively from about 1 vol. % to about 5 vol. %. In an alternative aspect, the reacted mixture is introduced to the second reactor continuously at a unit flow rate that ranges from about 1 vol. % to about 20 vol. %, alternatively from about 1 vol. % to about 15 vol. % or alternatively from about 1 vol. % to about 5 vol. % based on the total volume of the first reactor and timed to meet some user or process goal. For example, at least a portion of the reacted mixture may be conveyed at a rate ranging from about 1% of a volume of the first reactor per minute to about 20% of a volume of the first reactor per minute.

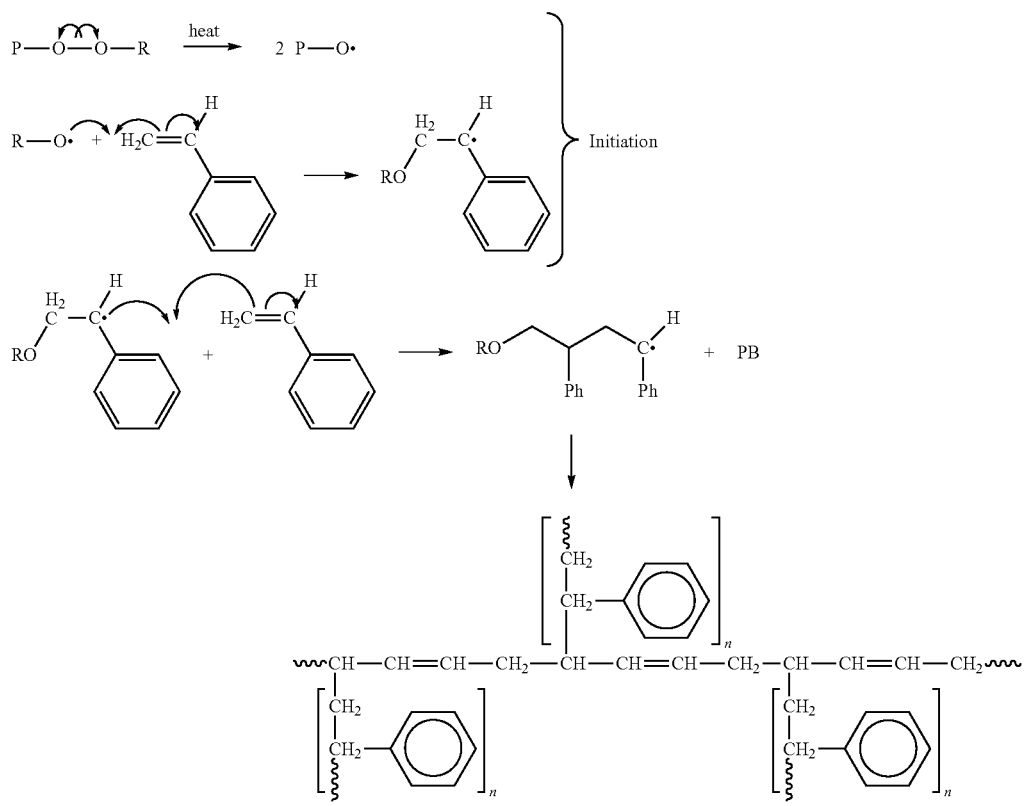

Scheme I

The reaction depicts the formation of polystyrene chains in the presence of PB leading to the production of a grafted polybutadiene PS, which is a factor influencing the morphology of HIPS.

In an aspect, the feedstock is polymerized in the second reactor to at least the phase inversion point in order to produce a reactor effluent. The reactor effluent may comprise unreacted styrene, polystyrene, polystyrene grafted rubber, and high impact polystyrene.

In an aspect, a method of the present disclosure comprises establishing a recirculation stream between the first and second reactor where the recirculation stream comprises some portion of the reactor effluent. A recirculation stream may be established between the first and second reactor such that the reactor effluent is introduced from the second reactor into the first reactor. In some aspects, the reactor effluent is introduced to the first reactor discontinuously in amounts that range from about 0.1 volume percent (vol. %) to about 20 vol. % based on the total volume of the second reactor, alternatively from about 0.1 vol. % to about 1 vol. % or alternatively from about 0.1 vol. % to about 0.5 vol. %. In an alternative aspect, the reactor effluent is introduced to the first reactor continuously at a unit flow rate that ranges from about 0.1 vol. % to about 20 vol. %, alternatively from about 0.1 vol. % to about 1 vol. % or alternatively from about 0.1 vol. % to about 0.5 vol. % based on the total volume of the second reactor and timed to meet some user or process goal.

In some aspects of the present disclosure the IM-HIPS is produced in a staged process. Herein the process described may be numerically ordered in stages (i.e., Stage 1, Stage 2) for ease of reference however it is not intended to limit the performance of the activities in each stage to a particular order. For example, one or more activities described for a particular stage may be carried out concurrently with one or more activities of another stage whether that "another stage" is designated numerically as being subsequent to or prior to the "particular stage." Such modifications in terms of the timing of the activities performed in any particular stage may be made by one of ordinary skill in the art with the benefits of the present disclosure.

In an aspect of the present disclosure, a method for the production of an IM-HIPS has a first stage (i.e., Stage 1) comprising introducing to a first reactor a first reaction mixture comprising styrene monomer, an elastomeric particle and a free-radical initiator. The first reaction mixture may then be subjected to conditions in the first reactor suitable for polymerization of the first reaction mixture. For example, the first reactor may be heated to a temperature of from about 100° C. to about 150° C., alternatively from about 110° C. to about 135° C. or alternatively from about 115° C. to about 120° C. for a time period of from about 30 min to about 120 min, alternatively from about 30 min to about 90 min or alternatively from about 30 min to about 60 min. In an aspect, Stage 1 comprises polymerizing the first reaction mixture to a point prior to phase inversion to produce a reacted mixture having a solids content ranging from about 1% to about 25%, alternatively from about 1% to about 15% or alternatively from about 5% to about 10% based on the total amount of material in the reactor.

In an aspect of the present disclosure, the method comprises a second stage (Stage 2) where the reacted mixture is used as the feedstock for the second reactor. In this aspect, the reacted mixture is conveyed from the first reactor to the second reactor using any suitable methodologies. The reacted mixture may be conveyed in a continuous fashion to the second reactor at any suitable rate. In an aspect, the reacted mixture in the second reactor is subjected to conditions suitable for continued polymerization of the reacted mixture. In some aspects, the polymerization conditions in the second reactor are the same as the polymerization conditions in the first reactor, alternatively the polymerization conditions in the second reactor differ from the polymerization conditions in the first reactor. For example, the polymerization conditions in the second reactor may comprise a temperature in the range of from about 110° C. to about 160° C., alternatively from about 120° C. to about 145° C. or alternatively from about 125° C. to about 130° C. for a time period of from about 90 min to about 180 min, alternatively from about 90 min to about 150 min or alternatively from about 90 min to about 120 min. In such aspects, the reacted mixture may be subjected to polymerization until such a point as a reactor effluent comprising at least 50% solids is formed in the second reactor, alternatively at least 40% solids or alternatively at least 30% solids based on the total amount of material in the reactor.

In an aspect of the present disclosure, the third stage of the process (i.e., Stage 3) comprises establishing a recirculation stream between the first and second reactor. For example, a portion of the reactor effluent comprising from about 10% to about 50% solids may be introduced to the first reactor at a rate of from about 0.1 vol. % to about 20 vol. %, alternatively from about 0.1 vol. % to about 1 vol. % or alternatively from about 0.1 vol. % to about 0.5 vol. % based on the total volume of the second reactor and timed to meet some user or process goal. In an aspect, the recirculation stream may be established anytime after the formation of a percent solids in the second reactor of from about 5% to about 50%, alternatively from about 10% to about 40% or alternatively from about 15% to about 30% based on the total amount of material in the reactor. In such aspects, during Stage 3 the process for preparation of an IM-HIPS of the present disclosure comprises a first and second reactor in fluid communication via at least a first conduit and a second conduit where the first conduit conveys the reacted mixture from the first reactor to the second reactor and the second conduit conveys the reactor effluent from the second reactor to the first reactor.

In an aspect, a process for the preparation of an IM-HIPS may comprise additional stages (e.g., Stage 3+x where x≥1) in which the reactor effluent from the second reactor is conveyed to one or more additional reactors for further polymerization and/or processing to meet some user and/or application-desired goal.

In yet another aspect, a process for producing high impact polystyrene comprises introducing to a reactor a partially-polymerized mixture comprising at least one vinyl aromatic monomer, an elastomer and reacted vinyl aromatic monomer wherein the partially-polymerized mixture has not undergone phase inversion. The process may further comprise polymerizing the partially-polymerized mixture in the reactor to the phase inversion point to form a phase-inverted mixture. Polymerization of the partially-polymerized mixture may be carried out under conditions of the type disclosed herein. In an aspect, the method further comprises recovering a portion of the phase-inverted mixture from the reactor wherein the phase-inverted mixture comprises high impact polystyrene and introducing another portion of the phase-inverted mixture to another reactor. In an aspect, the reactor and the another reactor are the same type of reactor. Alternatively the reactor and the another reactor are different types of reactors.

Figure 2:
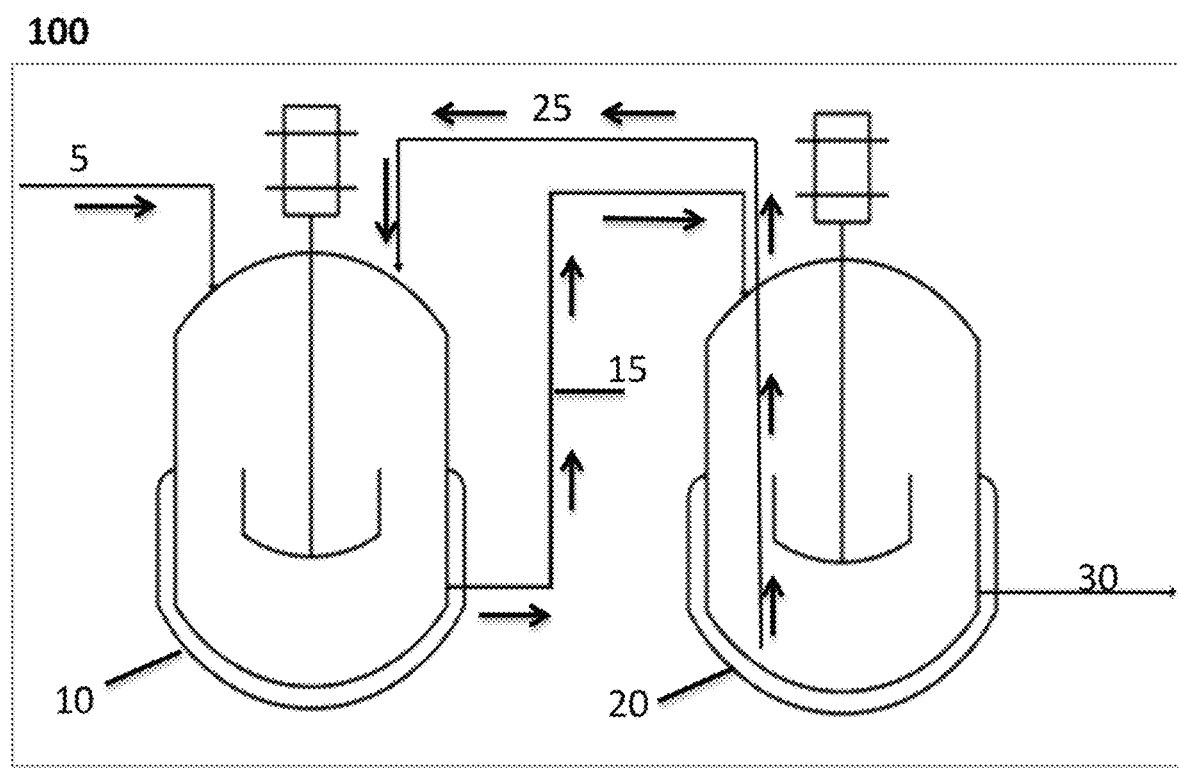
FIG. 2 is a schematic of a polymerization reactor system.

In aspects where the reacted mixture is introduced continuously, the first reactor may be in fluid communication with the second reactor. For example, the first reactor may comprise a reactor having an inlet configured to receive the first reaction mixture and an outlet configured to convey the reacted mixture to an inlet of the second reactor. The recirculation stream may be established between an outlet of the second reactor and an inlet of the first reactor. This is schematically depicted in FIG. 2. Referring to FIG. 2, a portion of a reactor system for preparation of an IM-HIPS is depicted, 100, having a first reactor, 10, and a second reactor, 20. A first reaction mixture may be conveyed via line 5 to reactor 10 where when subjected to polymerization conditions of the type disclosed herein produces a reacted mixture. The reacted mixture may be conveyed from the first reactor, 10, via line 15 to reactor 20 which after subjection to polymerization conditions, also of the type disclosed herein, produces a reactor effluent. A portion of the reactor effluent may be conveyed from the second reactor 20 via line 25 to the first reactor 10, i.e., establishing a recirculation stream. Additionally, the reactor effluent may be conveyed via line 30 to additional downstream processes.

Although the lines for conveying a material (e.g., a reactor effluent) are depicted at specific locations on the reactors (e.g., FIG. 2, line 5 to reactor 10), it is contemplated that these lines may be located as desired by one of ordinary skill in the art to allow for conveyance of material to any area of the reactor. For example, FIG. 2 line 5, may allow for introduction of the materials (e.g., a first reaction mixture) through the top of the first reactor 10, as shown in FIG. 2. Lines that allow for the flow of materials to and from the reactor may be disposed anywhere on the reactor such that materials (e.g., a first reaction mixture, reactor effluent) can be introduced/removed from any position along the reactor provided that such positions are compatible with the materials being conveyed and the equipment being utilized.

In an aspect, the first reactor (e.g., reactor 10 of FIG. 2), the second reactor (e.g., reactor 20 of FIG. 2) or both may be continuous stirred tank reactors. A continuous stirred tank reactor (CSTR) generally refers to a reaction vessel that can be continuously stirred or agitated by using any suitable agitation means, such as for example a rotary agitator; a magnetic stirrer; bubbling or sparging an inert gas through a liquid phase. A CSTR can be operated as a batch process or a continuous process (e.g., reagents are periodically or continuously added to the CSTR while reaction mixture is periodically or continuously removed from the CSTR).

In another aspect, the first reactor (e.g., reactor 10 in FIG. 2), the second reactor (e.g., reactor 20 in FIG. 2) or both are plug flow reactors (PFR). Herein PFRs refer to reactors where generally one or more fluid reagents are pumped through a pipe or tube; a chemical reaction proceeds as the reagents travel through the plug flow reactor, and a mixture containing the product is collected as a reactor effluent.

In yet another aspect of the present disclosure, a reactor system suitable for use in the present disclosure comprises one or more CSTRs and one or more PFRs as needed to produce an IM-HIPS of the type disclosed herein.

In an aspect, any mixture subjected to polymerization conditions of the type disclosed herein for the production of an IM-HIPS (e.g., first reaction mixture) comprises a vinylidene aromatic monomer, alternatively styrene. Styrene, also known as vinyl benzene, ethylenylbenzene and phenylethene is an organic compound represented by the chemical formula $C_8H_8$. Similar vinylidene aromatic monomers may be substituted in whole or in part for styrene. Such monomers include without limitation a variety of substituted styrenes (e.g., α-methyl styrene), ring-substituted styrenes such as p-methylstyrene, disubstituted styrenes, and unsubstituted styrenes. In an aspect. styrene monomer makes up at least 70 wt % of any mixture subjected to polymerization conditions of the type disclosed herein for the production of an IM-HIPS, alternatively from about 70 wt. % to about 95 wt. % or alternatively from about 85 wt. % to about 95 wt. % based on the total weight of the mixture.

In an aspect, any mixture subjected to polymerization conditions of the type disclosed herein for the production of an IM-HIPS (e.g. first reaction mixture) comprises at least one free radical initiator. Such free radical initiators may function as the source of free radicals to enable the polymerization of styrene. In an aspect, any initiator capable of free radical formation that facilitates the polymerization of styrene may be employed. Such free radical initiators include by way of example and without limitation organic peroxides. Examples of organic peroxides suitable for use in the present disclosure include without limitation diacyl peroxides, peroxydicarbonates, monoperoxycarbonates, peroxyketals, peroxyesters, dialkyl peroxides, hydroperoxides or any combination thereof.

In an aspect, the free radical initiator level in the reaction is given in terms of the active oxygen in parts per million (ppm). In an aspect, the level of active oxygen level in the disclosed reactions for the production of an IM-HIPS is from about 20 ppm to about 80 ppm, alternatively from about 20 ppm to about 60 ppm, alternatively from about 30 ppm to about 60 ppm. As will be understood by one of ordinary skill in the art, the selection of initiator and effective amount will depend on numerous factors (e.g. temperature, reaction time) and can be chosen by one skilled in the art to meet the desired needs of the process.

In an aspect, any mixture subjected to polymerization conditions of the type disclosed herein for the production of an IM-HIPS (e.g., first reaction mixture) comprises a conjugated diene monomer as the elastomer (rubber). Examples of conjugated diene monomers suitable for use in the present disclosure include without limitation 1,3-butadiene, 2-methyl-1,3-butadiene, 2-chloro-1,3 butadiene, 2-methyl-1,3-butadiene, and 2-chloro-1,3-butadiene.

In an aspect, the elastomer comprises an aliphatic conjugated diene monomer. Without limitation, examples of aliphatic conjugated diene monomers suitable for use in the present disclosure include $C_4$ to $C_9$ dienes such as butadiene monomers. Blends or copolymers of the diene monomers may also be used. Likewise, mixtures or blends of one or more elastomers may be used. In an aspect, the elastomer comprises a homopolymer of a diene monomer, alternatively, the elastomer comprises polybutadiene. In an aspect, the elastomer may be present in any mixture subjected to polymerization conditions of the type disclosed herein for the production of an IM-HIPS in an amount of equal to or greater than about 1 wt. %, alternatively from about 6 wt. % to about 10 wt. %, alternatively about 6 wt. %, about 7 wt. %, about 8 wt. %, about 9 wt. %, or about 10 wt. %, alternatively from about 8 wt. % to about 9 wt. %, alternatively from about 8.3 wt. % to about 8.7 wt. %, alternatively about 8.5 wt. % based on total weight of the mixture In an aspect, the IM-HIPS may also contain additives to impart desired physical properties, such as, increased gloss or color. Such additives may be introduced at any suitable point in preparation of the IM-HIPS. Examples of additives include without limitation chain transfer agents, talc, antioxidants, UV stabilizers, lubricants, mineral oil, plasticizers and the like. The aforementioned additives may be used either singularly or in combination to form various formulations of the IM-HIPS. For example, stabilizers or stabilization agents may be employed to help protect the IM-HIPS from degradation due to exposure to excessive temperatures and/or ultraviolet light. These additives may be included, singularly or in combination, in amounts effective to impart the desired properties. Effective additive amounts and processes for inclusion of these additives to polymeric compositions are known to one skilled in the art.

In an aspect, an IM-HIPS of the present disclosure is characterized by a swell index of from about 5% to about 30%, alternatively from about 5% to about 15% or alternatively from about 10% to about 15%. Swell index can be used to measure the extent of bonding (crosslinking) between elastomer molecules (e.g., polybutadiene). Swell index may be determined by taking a ratio between mass of moist gel to mass of dry gel, as determined in accordance with ASTM D3616.

In an aspect, an IM-HIPS of the present disclosure is characterized by a gel content of from about 10% to about 50%, alternatively from about 5% to about 30% or alternatively from about 15% to about 25%. The gel content, which expresses the degree of grafting, i.e. the quantity of polystyrene grafted on to the rubber, is determined by shaking 1 g of the IM-HIPS in 20 ml of toluene at room temperature and then centrifuging the whole to separate toluene-insoluble gel from the remainder.

In an aspect, an IM-HIPS of the type disclosed herein has a rubber particle size (RPS) ranging from about 1 micron to about 10 microns, alternatively from about 1 micron to about 8 microns or alternatively from about 1 micron to about 5 microns and a rubber particle size distribution (i.e., RPSD or span) of less than about 1.5, alternatively less than about 1.3 or alternatively from about 1.0 to about 1.3. The RPS and span may be determined using any suitable methodology, for example using ASTM F577-78 Malvern Particle Size Analyzer. The RPS is measured in microns while the span is a dimensionless number which is a measure of broadness of the distribution.

In an aspect, an IM-HIPS of the type disclosed herein has a gel:rubber ratio ranging from about 1 to about 10, alternatively from about 2 to about 5 or alternatively from about 2 to about 3 as determined by the ratio between the % gel and the % rubber content used in the sample. The gel:rubber ratio represents the amount of polystyrene present in the rubber phase (occluded inside the rubber particles or attached to the polybutadiene molecules).

In an aspect, an IM-HIPS of the type disclosed herein has a rubber-phase volume fraction (RPVF) ranging from about 10% to about 50%, alternatively from about 15% to about 35% or alternatively from about 20% to about 30% as determined by the percent volume of the rubber phase in the sample.

An IM-HIPS of the present disclosure may be characterized by a structure having elastomer dispersed in the polystyrene matrix wherein each elastomer cell has multiple occlusions of polystyrene either partly or completely trapped within the rubber cell. In an aspect, such occlusions may range in size of from about 0.1 microns to about 2.0 microns, alternatively from about 0.1 microns to about 1 microns or alternatively from about 0.5 microns to about 1 micron as determined by image analysis performed on images obtained by Electron Microscopy techniques.

The HIPS produced by the disclosed methodologies may be useful for a range of applications including but not limited to; food packaging, office supplies, point-of-purchase signs and displays, housewares and consumer goods, building insulation and cosmetics packaging.

EXAMPLES

The subject matter of the present disclosure having been generally described, the following examples are given as particular aspects thereof and to demonstrate the practice and advantages thereof. It is understood that the examples are given by way of illustration and are not intended to limit the specification or the claims in any manner.

Example 1

In the following experiment, batch polymerizations were carried out using the feed formulation described in Table 1. The same feed formulation was used in all the examples. All rubber was dissolved in a feed solution prior to experimentation.

TABLE 1

| Feed | Wt. % |
|---|---|
| Rubber - Buna CB 550 | 5.0 |
| Ethyl Benzene (%) | 4.5 |
| MO - Drakeol 600 (%) | 1.4 |
| Styrene Monomer (%) | 89.2 |
| Luperox PST (ppm) | 220 |
| Zinc Stearate (ppm) | 500 |

For the batch reactions, a determined volume of Reaction A (30 and 50 ml) was collected after phase inversion and added into the feed of Reaction B. Then, Reaction B was initiated and continued until conversion reached 70% and the material was devolatilized and polymer properties were tested. The temperature profile used during the reactions was as follow: 30 min at 120° C., followed by 180 min at 135° C. and then the temperature was increased to 150° C. until 70% solids was reached.

Polymer samples were collected from the second reaction (i.e., Reaction B) in aluminum pans. The aluminum pans were placed in a vacuum oven at 225° C. for 60 minutes to remove all the unreacted styrene and solvent. Devolatilized sample properties' were tested. Analytical results for these samples, such as swell index, particle size, and amount of recirculation, are listed in Table 2.

TABLE 2

| | Control | Reaction 1B | Sample 2B |
|---|---|---|---|
| Vol. of Recirculation (ml) | 0 | 30 | 50 |
| Swell Index (%) | 14.7 | 13.9 | 12.3 |
| Gel Content (%) | 21.2 | 22.8 | 22.8 |
| Rubber Particle Size (micron) | 4.7 | 4.6 | 5.7 |
| Span | 34.1 | 4.4 | 67.6 |

The results from these reactions indicated minor changes in terms of swell index. On the other hand, the rubber particles tended to increase in size as the amount of recirculation was increased from 30 ml to 50 ml.

Figure 3:
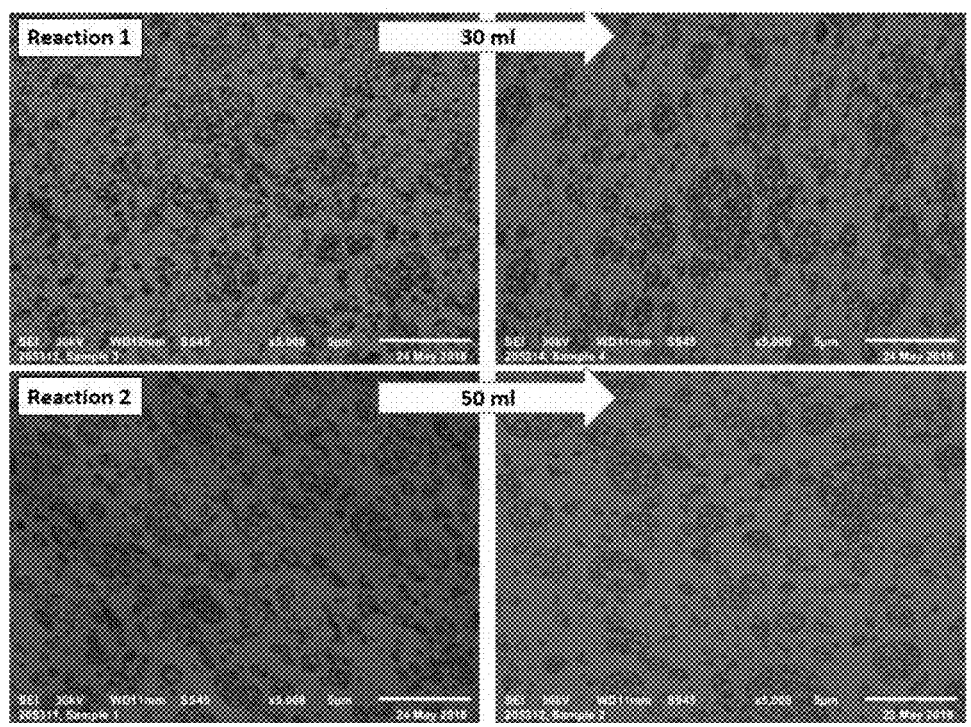
FIGS. 3 and 4 are scanning transmission electron micrographs of samples from Examples 1 and 2.

Scanning Transmission Electron Microscopy (STEM) collected images of the polymer at 3000× and 5000× magnification, FIG. 3. Rubber particles appear as the darker phase. Image analysis was used to measure the rubber particles and occlusion diameters and as well as rubber particle volume fraction (RPVF). From the STEM images, FIG. 3, it appears that more uniform occlusions are obtained by the presence of grafted copolymer. In the case of Reaction B, where 50 ml were transferred, the effect on the occlusion morphology is more noticeable.

Example 2

In the following experiment, the production of an IM-HIPS of the type disclosed herein was evaluated in a continuous process using a CSTR unit and the feed formulation described in Table 1. The laboratory experiments carried out in a continuous process investigated introducing grafted copolymer during the rubber particle formation with the goal to improve its stability and promote the formation of more uniform rubber particles. Two different strategies were evaluated during this experiment; (1) reaction mixture collected from a previous reaction introduced in the feed of a second reaction and (2) a recirculation loop between the two CSTR reactors.

The CSTR unit used consisted of two CSTR type reactors connected by metal tubing where feed was added continuously at a determined rate. Reference is made to FIG. 2 for a schematic of the reactor system. Flow rates used were maintained at 6 g/min. Reactor volumes were kept constant at 200 ml in the first reactor and 600 ml in the second reactor. Temperatures were sustained at 120° C. and 135° C. for the first and second reactor, respectively. A total rubber content of 7% was the specification after devolatization. Polymer samples were collected from the second reactor in aluminum pans after 8 hours of continuous operation of the reactor. The aluminum pans were placed in a purge oven at 135° C. overnight to complete 70% conversion. Samples were then placed in vacuum oven at 225° C. for 60 minutes to remove all styrene and solvent residuals. Devolatilized samples were then tested for morphology and physical properties. Morphology images taken by STEM were analyzed to quantify occlusions and rubber particles formed.

In the case of the first strategy, lab reactions were completed where a determined volume of a reaction was collected just moments after phase inversion and used in the feed of a subsequent polymerization reaction. From the analytical results, Table 3, it was noted that the particle size tends to increase for the reaction with 15% material in the freed while an opposite effect is observed in the reaction with 25% material in the feed. In HIPS, grafted copolymer is needed to stabilize the interphase between the PS phase and PB phase but high levels of grafting copolymer will also lead to smaller rubber particle sizes, which was assumed to have occurred for the experiment where 25% of recirculated material was used.

TABLE 3

|  | Control | 15% in Feed | 25% in Feed |
|---|---|---|---|
| Swell Index (%) | 11.3 | 14.0 | 11.9 |
| Gel Content (%) | 24.6 | 22.0 | 23.6 |
| RPS (microns) | 5.5 | 6.3 | 5.4 |
| Span | 22.4 | 7.3 | 25.7 |

In the experiments following the second strategy, 5% and 10% ratios were used as the amount that was recirculated with respect to the unit flow rate, which was 6 g/min. The reactions were monitored by measuring % solids and RPS throughout the experiments. Once the reactions reached steady state, material was collected and finished in the oven targeting a final solids content of 70%. The analytical results showed that the RPS decreased as the amount of recirculation was increased. These results are presented in Table 4. Moreover, the span value also decreased indicating a more uniform rubber particle size distribution.

TABLE 4

|  | Control | 5% Recirculation | 10% Recirculation |
|---|---|---|---|
| Swell Index (%) | 10.1 | 10.0 | 11.0 |
| Gel Content (%) | 22.3 | 22.7 | 22.3 |
| RPS (microns) | 3.1 | 3.2 | 2.4 |
| Span | 1.3 | 1.2 | 1.1 |
| Rubber content (%) | 7.2 | 7.1 | 7.0 |
| Gel/Rubber Ratio | 3.0 | 3.1 | 3.1 |

STEM analysis was completed to understand the effect on the sample morphology. The STEM images confirmed the Malvern data where the RPS values and the span decreased as the amount of recirculation was increased. From the STEM images, more uniform rubber particles can be observed when the amount of recirculation was increased. This effect is the result of the higher amount of grafted copolymer present during the phase inversion which requires a larger PS-PB interphase promoting more and smaller rubber particles. In addition, the occlusions morphology seems to be impacted as well as the rubber particles became smaller in size.

Figure 4:
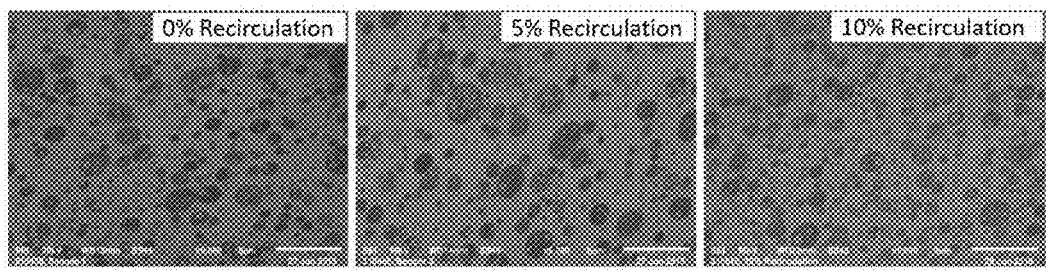

To quantify the effect of the recirculation stream on the samples morphology, STEM images were analyzed, see FIG. 4. A summary of the data collected from this analysis is shown in Table 5 and the data confirmed a decrease in rubber particle size and occlusion lengths with increasing % recirculation. On the other hand, a decrease on the standard deviation is also noted which indicates a narrower particle size distribution. This effect is more noticeable in the case of the occlusion size as in decreased from 0.460 to 0.065.

TABLE 5

| Recirculation (%) | Rubber Particles Size (um) | σ | Occlusions Size (um) | σ | RPVF (%) |
|---|---|---|---|---|---|
| 0 | 1.005 | 0.562 | 0.254 | 0.460 | 32.01 |
| 5 | 0.864 | 0.635 | 0.215 | 0.114 | 31.76 |
| 10 | 0.714 | 0.356 | 0.184 | 0.065 | 34.27 |

These experiments demonstrated that grafted copolymer developed after phase inversion can be used as a means to produce more uniform rubber particle size distributions. The correlation between narrower rubber particle size distributions and higher % recirculation was supported by the STEM images as more uniform rubber particles can be observed when the amount of recirculation was increased. This effect is thought to be the result of the higher amount of grafted copolymer present during the phase inversion which requires a larger PS-PB interphase promoting more and smaller rubber particles. A similar effect was noted in the case of the occlusions.

Additional Disclosure

A first aspect which is a process for producing high impact polystyrene comprising introducing to a reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the reactor to the phase inversion point to form a phase-inverted mixture; discharging to another reactor at least a portion of the phase-inverted mixture; and recovering a portion of the phase-inverted mixture wherein the recovered portion of the phase-inverted mixture comprises high impact polystyrene.

A second aspect which is a process for producing high impact polystyrene comprising: introducing to a reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the reactor to the phase inversion point to form a phase-inverted mixture; introducing to another reactor a portion of the phase-inverted mixture; and recovering another portion of the phase-inverted mixture, wherein the phase-inverted mixture comprises high impact polystyrene.

A third aspect which is the process of any of the first and second aspects wherein the vinyl aromatic monomer is a styrene, a substituted styrene, an unsubstituted styrene or any combination thereof.

A fourth aspect which is the process of any of the first through third aspects wherein the elastomer is a polymer of butadiene.

A fifth aspect which is the process of any of the first through fourth aspects wherein the first reaction mixture further comprises a free radical initiator, a chain transfer agent or any combination thereof.

A sixth aspect which is the process of any of the first through fifth aspects wherein the reactor is a continuously stirred tank reactor, a plug flow reactor, or any combination thereof.

A seventh aspect which is the process of any of the first through sixth aspects wherein the at least a portion of the reacted mixture is conveyed from an outlet of a reactor to an inlet of the another reactor.

An eighth aspect which is the process of the seventh aspect wherein the at least a portion of the reacted mixture is conveyed at a rate ranging from about 1% of a volume of the first reactor per minute to about 20% of a volume of the first reactor per minute.

A ninth aspect which is the process of any of the first through eighth aspects wherein the at least a portion of the reacted mixture is conveyed as a continuous discharge.

A tenth aspect which is the process of any of the first through ninth aspects wherein the high impact polystyrene has a swell index of from about 5% to about 30%.

An eleventh aspect which is the process of any of the first through tenth aspects wherein the high impact polystyrene has a rubber particle size of from about 1 micron to about 10 microns.

A twelfth aspect which is the process of any of the first through eleventh aspects wherein the high impact polystyrene has a rubber particle size distribution of less than about 1.5.

A thirteenth aspect which is the process of any of the first through twelfth aspects wherein the high impact polystyrene has occlusions ranging in size from about 0.1 microns to about 2 microns.

A fourteenth aspect which is a process for producing high impact polystyrene comprising introducing to a first reactor a partially-polymerized mixture comprising at least one vinyl aromatic monomer, an elastomer and reacted vinyl aromatic monomer wherein the partially-polymerized mixture has not undergone phase inversion; polymerizing the partially-polymerized mixture in the first reactor to the phase inversion point to form a phase-inverted mixture; introducing to a second reactor a portion of the phase-inverted mixture from the first reactor, wherein the second reactor is disposed downstream of the first reactor and recovering another portion of the phase inverted mixture, wherein the recovered another portion of the phase-inverted mixture comprises high impact polystyrene.

A fifteenth aspect which is a high impact polystyrene reactor system, comprising a first continuously stirred tank reactor having (a) an inlet configured to receive (i) at least one vinyl aromatic monomer, (ii) an elastomer, and (iii) a free radical initiator and (b) an outlet configured to convey a first reactor effluent; a second continuously stirred tank reactor having (a) an inlet in fluid communication with the first continuously stirred tank reactor outlet and configured to receive (i) a portion of the first reactor effluent from the first continuously stirred tank reactor, (ii) at least one vinyl aromatic monomer, (iii) an elastomer, and (iv) a free radical initiator and (b) an outlet configured to convey a portion of a second reactor effluent comprising high impact polystyrene; and (c) a conduit for establishing a recirculation stream between the second reactor and the first reactor wherein the recirculation stream comprises another portion of the second reactor effluent.

A sixteenth aspect which is the reactor system of the fifteenth aspect wherein the first continuously stirred tank reactor is arranged vertically with the inlet at the top and the outlet at the bottom.

A seventeenth aspect which is the reactor system of any of the fifteenth through sixteenth aspects wherein the vinyl aromatic monomer is a styrene, a substituted styrene, an unsubstituted styrene or any combination thereof.

An eighteenth aspect which is the reactor system of any of the fifteenth through seventeenth aspect wherein the elastomer is a polymer of butadiene.

A nineteenth aspect which is the reactor system of any of the fifteenth through eighteenth aspects wherein the recirculation stream from the second continuously stirred tank reactor is conveyed to the first continuously stirred tank reactor at a rate ranging from about 0.1% of a volume of the second continuously stirred tank reactor per minute to about 20% of a volume of the second continuously stirred tank reactor per minute.

A twentieth aspect which is the reactor system of any of the fifteenth through nineteenth aspects wherein the high impact polystyrene has a rubber particle size of from about 1 micron to about 10 microns.

A twenty-first aspect which is the reactor system of any of the fifteenth through twentieth aspects wherein the high impact polystyrene has a rubber particle size distribution of less than about 1.5.

A twenty-second aspect which is the reactor system of any of the fifteenth through twenty-first aspects wherein the high impact polystyrene has occlusions ranging in size from about 0.1 microns to about 2 microns.

A twenty-third aspect which is the reactor system of any of the fifteenth through twenty-second aspects further comprising one or more additional linear flow reactors for receiving at least a portion of the second reactor effluent.

While aspects of the presently disclosed subject matter have been shown and described, modifications thereof can be made by one skilled in the art without departing from the spirit and teachings of the presently disclosed subject matter. The aspects described herein are exemplary only, and are not intended to be limiting. Many variations and modifications of the presently disclosed subject matter disclosed herein are possible and are within the scope of the presently disclosed subject matter. Where numerical ranges or limitations are expressly stated, such express ranges or limitations should be understood to include iterative ranges or limitations of like magnitude falling within the expressly stated ranges or limitations (e.g., from 1 to 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the aspects of the presently disclosed subject matter. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein

What is claimed is:

1. A process for producing high impact polystyrene comprising:
    introducing to a first reactor a partially-polymerized mixture comprising at least one vinyl aromatic monomer, an elastomer and reacted vinyl aromatic monomer wherein the partially-polymerized mixture has not undergone phase inversion;
    polymerizing the partially-polymerized mixture in the first reactor to the phase inversion point to form a phase-inverted mixture;
    recovering a portion of the phase-inverted mixture from the first reactor wherein the phase-inverted mixture comprises high impact polystyrene; and
    introducing another portion of the phase-inverted mixture to another reactor wherein the another portion of the phase-inverted mixture comprises from about 1 volume percent (vol. %) to about 20 vol. % based on the total volume of the first reactor.

2. The process of claim 1 wherein the vinyl aromatic monomer is a styrene, a substituted styrene, an unsubstituted styrene or any combination thereof.

3. The process of claim 1 wherein the elastomer is a polymer of butadiene.

4. The process of claim 1 wherein the partially-polymerized mixture further comprises a free radical initiator, a chain transfer agent or any combination thereof.

5. The process of claim 1 wherein the first reactor is a continuously stirred tank reactor, a plug flow reactor, or any combination thereof.

6. The process of claim 1 wherein the at least a portion of the phase-inverted mixture is conveyed from an outlet of a reactor to an inlet of the another reactor.

7. The process of claim 6 wherein the at least a portion of the phase-inverted mixture is conveyed at a rate ranging from about 1% of a volume of the first reactor per minute to about 20% of a volume of the first reactor per minute.

8. The process of claim 1 wherein the at least a portion of the phase-inverted mixture is conveyed as a continuous discharge.

9. The process of claim 1 wherein the high impact polystyrene has a swell index of from about 5% to about 30%.

10. The process of claim 1 wherein the high impact polystyrene has a rubber particle size of from about 1 micron to about 10 microns.

11. The process of claim 1 wherein the high impact polystyrene has a rubber particle size distribution of less than about 1.5.

12. The process of claim 1 wherein the high impact polystyrene has occlusions ranging in size from about 0.1 microns to about 2 microns.

13. A process for producing high impact polystyrene comprising:
    introducing to a first reactor a partially-polymerized mixture comprising at least one vinyl aromatic monomer, an elastomer and reacted vinyl aromatic monomer wherein the partially-polymerized mixture has not undergone phase inversion;
    polymerizing the partially-polymerized mixture in the first reactor to the phase inversion point to form a phase-inverted mixture;
    introducing to a second reactor a portion of the phase-inverted mixture from the first reactor, wherein the second reactor is disposed downstream of the first reactor wherein the portion of the phase-inverted mixture comprises from about 1 volume percent (vol. %) to about 20 vol. % based on the total volume of the first reactor and
    recovering another portion of the phase inverted mixture, wherein the recovered another portion of the phase-inverted mixture comprises high impact polystyrene.

* * * * *